US007016440B1

(12) United States Patent
Singer et al.

(10) Patent No.: US 7,016,440 B1
(45) Date of Patent: Mar. 21, 2006

(54) ITERATIVE MMSE EQUALIZATION-DECODER SOFT INFORMATION EXCHANGE DECODING METHOD AND DEVICE

(75) Inventors: Andrew C. Singer, Champaign, IL (US); Ralf Koetter, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 746 days.

(21) Appl. No.: 09/640,204

(22) Filed: Aug. 16, 2000

(51) Int. Cl.
H04B 1/10 (2006.01)
(52) U.S. Cl. .................... 375/350; 375/285; 375/341; 375/348; 375/229
(58) Field of Classification Search ................ 375/229, 375/230, 232, 233, 346, 350, 262, 285, 341, 375/348; 708/300, 322, 323; 714/746, 752, 714/786, 794, 795
See application file for complete search history.

(56) References Cited

U.S. PATENT DOCUMENTS

| | | | | |
|---|---|---|---|---|
| 5,491,518 A | * | 2/1996 | Kim ........................... | 348/607 |
| 5,761,237 A | * | 6/1998 | Petersen et al. ............ | 375/148 |
| 6,061,395 A | * | 5/2000 | Tonami ....................... | 375/232 |
| 6,084,907 A | * | 7/2000 | Nagano et al. ............. | 375/230 |
| 6,097,763 A | * | 8/2000 | Djokovic et al. ........... | 375/260 |
| 6,263,030 B1 | * | 7/2001 | Khayrallah .................. | 375/341 |
| 6,314,147 B1 | * | 11/2001 | Liang et al. ................. | 375/346 |
| 6,671,338 B1 | * | 12/2003 | Gamal et al. ................ | 375/346 |
| 2002/0003846 A1 | * | 1/2002 | Khayrallah et al. ......... | 375/341 |
| 2002/0110206 A1 | * | 8/2002 | Becker et al. ............... | 375/346 |
| 2003/0118122 A1 | * | 6/2003 | Nefedov ..................... | 375/265 |

FOREIGN PATENT DOCUMENTS

GB        2354676 A  *  3/2001

OTHER PUBLICATIONS

Gerhard Bauch, Houman Khorram and Joachim Hagenauer, "Iterative Equalization and Decoding in Mobile Communications Systems", *VDE-Verlag. Ntg-Fachberichete*, No. 145, 1997, pp. 307-312.

Hidekazu Murata, Susumu Yoshida, and Tsutomu Takeuchi, *Performance of Adaptive Equalizer Using Iterative Application of Viterbi Algorithm*, Electronics and Communications in Japan, Part 1, vol. 77, No. 4, p. 103-110, 1994.

Dan Raphaeli, Yoram Zarai, *Combined Turbo Equalization and Turbo Decoding*, Tel Aviv University, p. 639-643, 1997 IEEE.

Dan Raphaeli and Yoram Zarai, *Combined Turbo Equalization and Turbo Decoding*, IEEE Communications Letters, vol. 2, No. 4, p. 107-109, Apr. 1998.

Daniel Yellin, Alexander Vardy, and Ofer Amrani, *Joint Equalization and Coding for Intersymbol Interference Channels*, IEEE Transactions on Information Theory, vol. 43, No. 2, p. 409-425, Mar. 1997.

(Continued)

Primary Examiner—Jean B. Corrielus
(74) Attorney, Agent, or Firm—Greer, Burns & Crain, Ltd.

(57) ABSTRACT

A method and device employing an iterative MMSE equalization-decoder soft information exchange decoding. The method uses a MMSE equalizer which receives and outputs soft information. The equalizer exchanges soft information with a soft input soft output decoder, preferably an error correction decoder. The nature of the equalizer permits solutions beyond one-dimensional data streams and permits solutions for long channel lengths and multi-dimensional data since the solution is not a function of the channel impulse response.

5 Claims, 1 Drawing Sheet

OTHER PUBLICATIONS

L. Vandendorpe, O. Van de Wiel, *Performance Analysis of Linear Joint Multiple Access Interference Cancellation-Equalization For Asynchronous Multitone CDMA*, p. 537-541, 1995 IEEE.

Mao-Ching Chiu and Chi-chao Chao, *Performance of Joint Equalization and Trellis-Coded Modulation on Multipath Fading Channels*, IEEE Transactions on Communications, vol. 43, No. 2/3/4, p. 1230-1234, Feb./Mar./Apr. 1995.

Joachim Hagenauer and Max Winklhofer, *The Analog Decoder*, ISIT 1998, Cambridge, MA, Aug. 16-21, p. 145, 1998 IEEE.

Sirikiat Lek Ariyavisitakul and Ye (Geoffrey) Li, *Joint Coding and Decision Feedback Equalization for Broadband Wireless Channels*, IEEE Journal on Selected Areas in Communications, vol. 16, No. 9, p. 1670-1678, Dec. 1998.

Gerhard Bauch, Volker Franz, *Iterative Equalization and Decoding for the GSM-System*, p. 2262-2266, 1998 IEEE.

Cheolwoo You and Daesik Hong, *Nonlinear Blind Equalization Schemes Using Complex-Valued Multilayer Feedforward Neural Networks*, IEEE Transactions on Neural Networks, vol. 9, No. 6, p. 1442-1455, Nov. 1998.

Achilleas Anastasopoulos and Keith M. Chugg, *Iterative Equalization/Decoding of TCM for Frequency-Selective Fading Channels*, p. 177-181, 1998 IEEE.

Cheolwoo You and Daesik Hong, *Blind Adaptive Equalization Techniques Using the Complex Multi-Layer Perceptron*, p. 1340-1344, 1996 IEEE.

Pierre R. Chevillat and Evangelos Eleftheriou, *Decoding of Trellis-Encoded Signals in the Presence of Intersymbol Interference and Noise*, IEEE Transactions on Communications, vol. 37, No. 7, p. 669-676, Jul. 1989.

Jong II Park, Stephen B. Wicker and Henry L. Owen, *Concatenation of MLSE Equalizer and Viterbi Decoder for TDMA Cellular Systems*, p. 723-727.

Catherine Douillard, Michel Jezequel, Claude Berrou, Annie picart, Pierre Didier, Alain Glavieux, *Iterative Correction of Intersymbol Interference: Turbo-Equalization*, p. 507-511, vol. 6, No. 5, Sep.-Oct. 1995.

Xiaodong Wang and H. Vincent Poor, Princeton University, *Iterative (Turbo) Soft Interference Cancellation and Decoding for Coded CDMA*, p. 1-29.

* cited by examiner

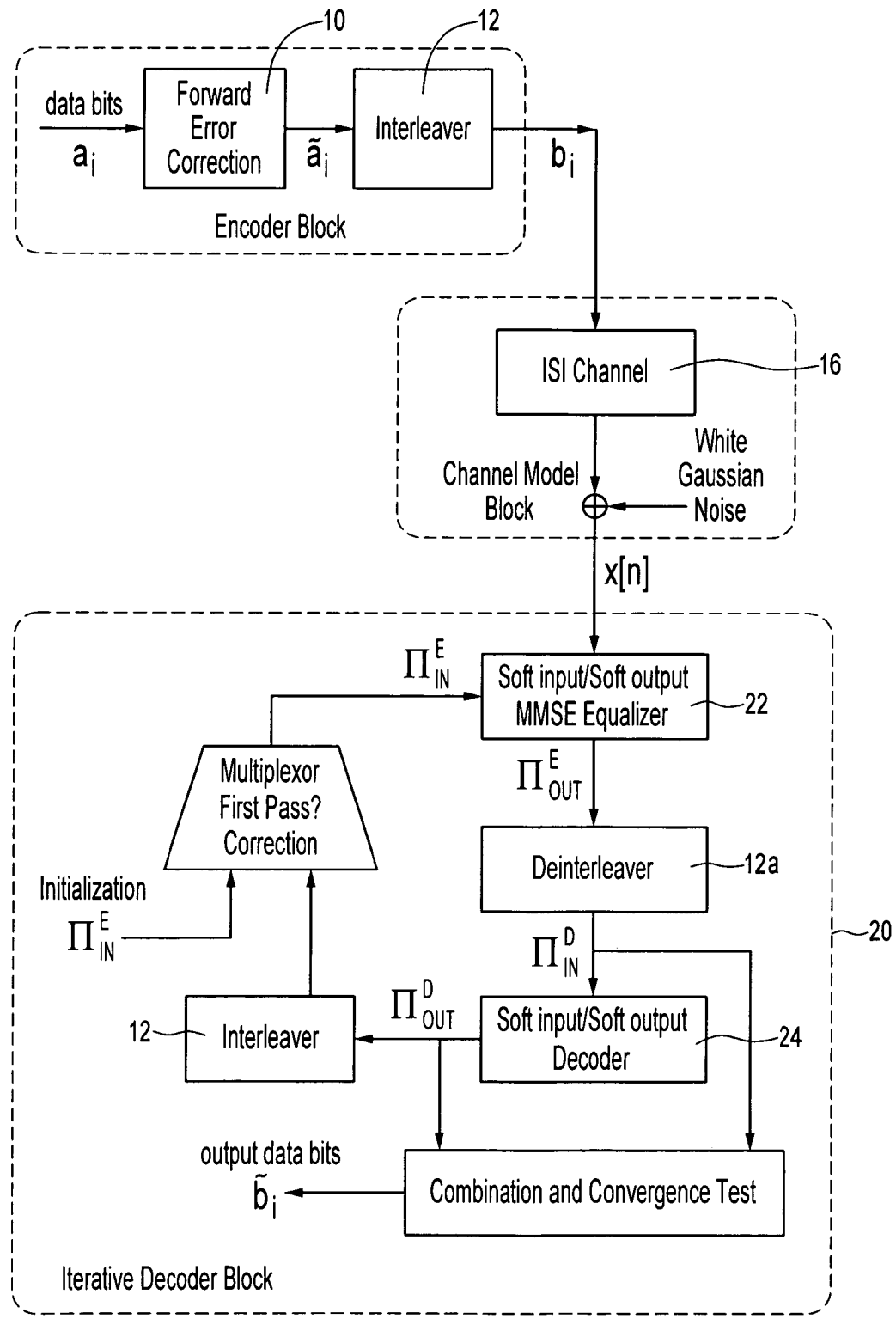
FIGURE

ITERATIVE MMSE EQUALIZATION-DECODER SOFT INFORMATION EXCHANGE DECODING METHOD AND DEVICE

FIELD OF THE INVENTION

The present invention concerns the field of decoding of information symbols received over a channel.

BACKGROUND OF THE INVENTION

Information symbols are transmitted over channels in most information, storage and communication devices. The channel can comprise, for example, a wired or wireless communication link between a transmitter or receiver, or an information path within a disk drive. More generally, any information path of limited bandwidth through which digital signals are transmitted may be defined as a channel. Such channels are subject to various types of distortion, e.g., additive noise and intersymbol interference. These distortions limit the data rate efficiencies for communication over such channels. Accordingly, much effort has been devoted to reducing the effect of such distortions in the channels. The obvious end goal is to decode symbols accurately. More specifically, the goal is to have low decoding error rates. A second and conflicting goal is to increase the ratio of data symbols to total channel symbols transmitted, i.e., the data rate.

Recent focus for joint equalization and decoding has been on iterative decoding schemes, and in particular, turbo coding schemes. These schemes are confidence building schemes in which an equalizer and decoder trade soft information in the form of symbol estimates until convergence is reached and hard decisions for symbols are output. These iterative schemes treat the channel contribution like an error correction code. The data symbols are generally permuted before transmission and are typically protected with a convolutional error correcting code. On the decoding side, soft information is exchanged between an error correction decoder and a channel decoder. However, all current implementations of these soft information exchange schemes use a forward/backward, Viterbi, or similar decoding algorithm for the decoding function. Specific examples are the forward/backward and soft output Viterbi algorithm for convolutional codes. In such decoding schemes, the complexity of the decoder is a design choice, but the complexity of a trellis based equalizer is a function of the length of the channel impulse response. This limits practical usefulness of the conventional decoding schemes to a class of channels having reasonably short impulse response lengths or small signal constellations.

The complex nature of conventional equalizing schemes in soft input exchange methods and devices also places certain physical limitations on devices which rely on such methods and devices for channel decoding. For example, there exist no solutions beyond one dimension for forward/backward and Viterbi algorithms. This dictates a one dimensional data stream, such as the stream obtained by a magnetic disk drive head or an optical disk drive. There is no significant physical reason for restriction to one-dimensional streams of data, but an as yet insurmountable hurdle for extension to higher dimensions is the lack of higher dimensional forward/backward and Viterbi algorithms. A decoding method with multi-dimensional decoding capability would free devices from the requirement of creating a one dimensional stream of data. For example, two dimensional regions of disk drives could be read simultaneously if two dimensional channel decoding is supported. The forward/backward and Viterbi algorithms used for data decoding are unable to handle the multidimensional task since multidimensional solutions are unknown.

Accordingly, there is a need for an improved method for decoding data received over a potentially noisy channel which addresses some or all of the aforementioned drawbacks. It is an object of the invention to provide such an improved method.

SUMMARY OF THE INVENTION

These and other needs and objects are met or exceeded by the present iterative MMSE equalization-decoder soft information exchange decoding method and device. The method uses a MMSE equalizer which receives and outputs soft information. The equalizer exchanges soft information with a soft information decoder. The simple nature of the equalizer permits solutions beyond one-dimensional data streams and for channels of arbitrary length and for signal constellations of arbitrary size.

BRIEF DESCRIPTION OF THE DRAWING

Other features, objects and advantages of the invention will be apparent to artisans from the detailed description and the FIGURE, which is a block diagram of a data communication system including an iterative MMSE equalization-decoder for soft information exchange decoding.

DETAILED DESCRIPTION OF THE PREFERRED EMBODIMENT

The invention is directed to a method for data recovery by confidence building. The invention is applicable, for example, to communications, telephony, recording, data transmission, and restoration. For example, even when the data has not been protected by an error correcting code, there may be other opportunities for confidence building decoders to operate. Suppose that the data were transmitted over multiple channels to the same receiver. This might arise when a preferred user in a cellular telephone system was given two or more cellular phone channels (for example multiple time-slots in a time-division multiple access scheme, multiple frequency slots in a frequency-division multiple access, or multiple spreading codes in a code division multiple access scheme), it might include storing the information on a data recording device multiple times (modular redundancy), or a receiver that has multiple antennas which can receive the same data at multiple locations. According to the invention, even without error correction coding, a confidence building data recovery system may be constructed, in which equalizers for each of the different channels exchange their beliefs, or estimates, of the data, until a consensus is achieved. A typical and more general case arises when there is one or multiple channels over which data is sent, and the data is protected by an error correction code, likely different for each channel, before being sent over each channel.

The generality of the confidence building data recovery method of the invention will be apparent to artisans. The method will be illustrated with reference to an error correction coded communication channel. An exemplary communication system including such a channel is shown in FIG. 1.

For simplicity, we consider transmission of binary digits $b_i$ using a Binary Phase Shift Keying (BPSK) modulation scheme. Artisans will understand that the invention is readily generalized to other modulation schemes. We assume that the bits $b_i$ are encoded in a forward error correction code C (typically a convolutional code), by an encoder 10, and that the bit stream is permuted by a suitable (e.g. random) interleaver 12 before the transmission.

The encoded symbols are denoted $ã_i$. Π is a permutation of the bits $ã_i$. The transmitted signal may be expressed as $$s(t) = \sum_i b_i h_s(t - iT)\exp(j(2\pi f_0 t + \phi_o))$$

where $f_o$ is the carrier frequency and $\phi_0$ is a constant angle. The received signal equals $$x(t) = \sum_i b_i h_s(t - iT)\exp(j(2\pi f_0 t + \phi_1)) + w(t),$$

where $\phi_1$ is a constant angle and $w(t)$ is an additive noise term. In addition to intersymbol interference, a channel 16 typically also adds a noise component. The signal $x(t)$ is demodulated, passed through a receiving filter and sampled leading to the equivalent discrete-time model of the communication link which is depicted in FIG. 1.

$$x[u] = \sum_i b_i h[n - i] + w[n],$$

where $h[j]$ are the sampled values of the overall impulse response of the communication system.

A discrete-time model of the channel 16 with intersymbol interference and additive noise $w_n$ is described as $$x[n] = b_n h[0] + w[u] + \sum_{i \neq n} b_i h[n - i].$$

where the term $$\sum_{i \neq n}\sum_i b_i h[n - i]$$

is usually referred to as intersymbol-interference.

We note that the received sampled signal $x[n]$ is a noisy version the convolution of the bit-sequence with the overall impulse response. In particular, for a finite length impulse response $h[j]$ the sequence $x[n]$ can be represented as a noisy output of a Markov process. The task of estimating symbols $b_i$ in the absence of a coding constraint is referred to as equalization. The invention concerns joint decoding and equalization of the bit-stream $x[n]$ in an iterative decoder 20 having a soft MMSE equalizer 22 exchanging information with a soft decoder 24.

It is well known how to optimally estimate $b_n$ from the sequence $x[n]$ using the so-called forward/backward algorithm. However, the complexity of this approach is usually impractical because the complexity is essentially the product of the complexities of an optimal decoding procedure and an optimal equalization only procedure. The complexity of an optimal equalization only procedure grows exponentially in the length of the overall impulse response, which, for practical channels with impulse response lengths in the tens to hundreds, is infeasible.

Iterative (Turbo) decoding and equalization uses at least two soft input/soft output (SISO) devices that communicate information. A SISO equalizer takes as input the received sequence $x[n]$ and some additional information about the symbol sequence $b_i$. This additional information could for example be a prior probability on the bits. The SISO equalizer produces a soft estimate of the symbols. This soft output could for example be a probability mass function indicating the likelihood of any symbol $b_i$ being equal to 0 or 1.

A second SISO block performs the decoding of the estimated bit sequence with respect to the code. In other words the soft input decoder takes as input reliability information (typically a probability mass function) and produces as soft output a probability mass function indicating the likelihood of any symbol $b_i$ being equal to 0 or 1. The input reliability information for the equalizer (decoder) is denoted $\pi_{in}^E(\pi_{in}^D)$. The output of the devices is denoted as $\pi_{out}^E(\pi_{out}^D)$. For an overall channel impulse response $h[j]$, let the received values $x[n]$ and reliability vectors $\pi_{in}[n]$ n=1 ... N be given. Without loss of generality we assume that $0 \leq \pi_{in}[j] \leq 1$ for all $j \in \{0 \ldots N\}$. (The $\pi_{in}[j]$ can be thought of as prior probabilities).

We define a SISO equalizer mathematically as a device that performs an equalization function eq: $\mathbb{R}^N \times [0,1]^N \to [0,1]^N$ eq$(y, \pi_{in}^E) \mapsto \pi_{out}^E$, where $\pi_{out}^E$ can be thought of as a vector of a posteriori probabilities.

Similarly, we mathematically define an SISO decoder as a device that performs a decoding function dec: $[0,1]^N \to [0,1]^N$ dec $(\pi_{in}^D) \mapsto \pi_{out}^D$, where $\pi_{out}^D$ can be thought of as a vector of a posteriori probabilities.

The main idea of conventional iterative joint equalization and decoding is to let the two SISO blocks exchange information until they agree on a decision or until a maximal number of iterations is reached. As soon as the predetermined termination criterion is satisfied, the output and the input of the SISO decoder are combined in order to form a soft combined equalization decoding decision. If desired, a hard decision on any symbol can be derived from this soft value.

Typically after a suitable number of iterations the output of the joint equalizer decoder is formed by multiplying the values of the likelihood ratios $\pi_{in}^D/(1-\pi_{in}^D)$ and $\pi_{out}^D/(1-\pi_{out}^D)$.

In order to achieve good performance in such an iterative scheme, a permutation is included in the data path, which spreads out statistical dependencies between estimates. The exchange between decoder and equalizer establishes an inherent feedback loop. It is important that this feedback be mitigated as much as possible. We say that an equalizer (decoder) is well-behaved if $\pi_{out}^E[j]$ is not a function of $\pi_{in}^E[j]$ ($\pi_{out}^D[j]$ is not a function of $\pi_{in}^E[j]$).

We now can describe the iterative equalization/decoding scheme in the following algorithm:

1. INPUT: A permutation Π, a vector of received values y, and prior information about the symbols expressed as a vector of probabilities $\pi_{in}^E(\pi_{in}^E$ is usually a vector containing a value 0.5 in each position.)

2. Repeat the following steps until a termination criterion is reached.
   (a) $\pi_{out}^E = \text{eq}(y, \pi_{in}^E)$
   (b) in $\pi_{in}^D = \Pi^{-1}(\pi_{out}^E)$
   (c) $\pi_{out}^D = \text{dec}(\pi_{in}^D)$
   (d) $\pi_{in}^E = \Pi(\pi_{out}^D)$
   (e) If the termination criterion is not satisfied go to step 2a.
3. OUTPUT hard decisions for symbol $b_i$ comparing $$\frac{\pi_{out}^D[i]\pi_{in}^D[i]}{(1-\pi_{out}^D[i])(1-\pi_{in}^D[i])}$$

to 1.

Iterative joint equalization and decoding schemes can be compared on the basis of the above algorithm and various combinations of decoding functions and equalization functions have been reported on. As decoding functions we explicitly mention the forward-backward and the SOVA algorithm for convolutional codes. Adaptations of these algorithms have been employed in the equalizer function. However, while the complexity of the decoder is a design issue, the complexity of a trellis based equalizer is based on the length of the channel impulse response. This severely hampers practical use of iterative equalization decoding techniques based on the turbo principle. For channels with long impulse responses, the exclusively used equalization techniques are either linear equalization or decision feedback techniques without use of the decoder in the equalization process. The invention solves this problem by providing an equalization algorithm independent of the length of the channel impulse response that can be used in iterative decoding. In particular, a minimum mean square error equalizer is demonstrated by the invention to facilitate joint decoding and equalization. The iterative technique of the invention is applicable to channels with a short or long impulse response, and with small or large signal constellations.

Let b[n] be a sequence of symbols that have been transmitted through a communications channel, such as a wireless or wireline data link, or recorded onto some data recording medium, such as an optical ROM or magnetic disk or tape. A linear, equivalent base-band model for the received (or read-back) sequence of symbols is given by $$x[n] = \sum_{k=-L_1}^{L_2} h[k]b[n-k] + w[n],$$

where h[k] is the length $L_1+L_2+1$ impulse response of the channel, and w[n] is an additive noise term modeling electrical and thermal fluctuation and undmodeled components of the channel. This generic linear model is a widely accepted mathematical model for the distortions induced on a sequence of symbols both in communications and data storage applications. A linear equalizer for this channel can be used to attempt to reduce the effects of the intersymbol interference and the additive noise induced by the channel. A linear (affine) equalizer with coefficients c[n, k] and offset g[n] and symbol estimate b̂[n] can be expressed in the form $$\hat{b}[n] = \sum_{k=-N_1}^{N_2} c[n,k]x[n+k] + g[n],$$

where the equalizer coefficients are written as a function n to enable the possibility of different coefficients used to estimate each symbol b̂[n], and the offset g[n] provides a richer class of linear estimates which can account for a non-zero mean prior. The channel model can be written in matrix form as $$\vec{x}[n] = H\vec{b}[n] + \vec{w}[n],$$

where the channel response matrix, H, is given by $$\begin{bmatrix} h[L_2] & h[L_2-1] & \cdots & h[-L_1] & 0 & \cdots & 0 \\ 0 & h[L_2] & h[L_2-1] & \cdots & h[-L_1] & \cdots & 0 \\ & & & \vdots & & & \\ 0 & \cdots & 0 & h[L_2] & h[L_2-1] & \cdots & h[-L_1] \end{bmatrix},$$

and the signal vectors are given by $$\vec{x}[n] = [x[n-N_1] \ldots x[n] \ldots x[n+N_2]]^T,$$

$$\vec{b}[n] = [b[n-N_1-L_2] \ldots b[n] \ldots b[n+N_2+L_1]]^T,$$

$$\vec{w}[n] = [w[n-N_1] \ldots w[n+N_2]]^T.$$

The equalizer output can also be expressed in matrix form, simply as $$\hat{b}[n] = \vec{c}[n]^T \vec{x}[n] + g[n],$$

where the equalizer coefficients c[n,k] are written $$\vec{c}[n] = [c[n, -N_1], \ldots, c[n, N+2]].$$

With this channel model, the mean-square error of a symbol estimate b[n] based on the estimate b̂[n] is given by $$E\{|b[n]-\hat{b}[n]|^2\}, \qquad (2)$$

where the expectation is taken over the distribution of the symbols b[n] and the noise w[n]. In the conventional traditional approach to the design of complexity-constrained (finite $N_1$ and $N_2$) minimum mean-square error (MMSE) linear equalizers, it is assumed that the symbols b[n] are equally likely to take on all possible symbol values, and that there is no additional information about their values available. The conventional equalizer is determined by finding the coefficient values $\vec{c}[n]$ and g[n] which minimize the mean squared error (2), which, since the symbols are assumed unknown and equally likely for all time n leads to a single set of coefficients, $\vec{c}$, and the offset is given by g[n]=0.

According to the invention, the equalizer 22 implements an equalization algorithm which has available a set of priors over the symbols. For example, if the symbol alphabet is binary, then this would correspond to the availability of the sequence TE $\pi_{in}^E$=Prob {b[n]=1}. In the sequel, we assume that the channel response h[n] is real and that the symbol alphabet is b[n]∈{−1, 1} for simplicity. Extension to complex baseband channels and higher-order symbol constellations is straightforward. In this case, the MMSE equalizer 22 can be designed incorporating these priors into the optimization. Hence, the equalizer coefficients, $\vec{c}[n]$ and $g[n]$ can be determined by finding the minimum of the mean-squared error (2), where the expectation in (2) is over both the additive noise in the channel, and the given (time-varying) prior over the symbols. As a result, the equalizer coefficients will vary with time index, n. This leads to the following formulation, $$\hat{b}[n]=E\{b[n]\}+[E\{b[n]\vec{b}[n]\}H^T-E\{b[n]\}E\{\vec{b}[n]^T\}H^T][HE\{\vec{b}[n]\vec{b}[n]^T\}H^T+E\{|w[n]|^2\}I-HE\{\vec{b}[n]\}E\{\vec{b}[n]^T\}H^T]^{-1}(\vec{x}[n]-HE\{\vec{b}[n]\}).$$

Once the equalizer has produced MMSE linear estimates of the symbols $\hat{b}[n]$, these estimates must be mapped into priors $\pi_{out}^E$. One method for mapping the outputs of the linear equalizers is to assume the output distribution $\hat{b}[n]$ is conditionally Gaussian, distributed about the symbol values. This leads to the following mapping $$Prob\{b[n]=1\mid \hat{b}[n]\}=\frac{1}{2}\left(1+\tanh\left(\frac{\hat{b}[n]}{\sigma_{\hat{b}}^2}\right)\right),$$

where $\sigma_{\hat{b}}^2$ is the variance of the conditional output distribution given the symbol $b[n]=\text{sign}(\hat{b}[n])$. In order for this equalizer to be considered well-behaved, the estimate $\hat{b}[n]$ cannot be a function of $\pi_{in}^E[n]$. Hence, the expectations must be taken over a distribution of the symbols which excludes $\pi_{in}^E[n]$ for the calculation of $\hat{b}[n]$. However, in calculating $\hat{b}[k]$, $k\neq n$, $\pi_{in}^E[n]$ may be used. This leads to the following method for computing the output distribution given the observations, $x[n]$ and the input distribution $\pi_{IN}^E$.

Create Buffers

1. Create buffers for the priors, the signal $x[n]$, the expectations $\vec{bb}[n]=E\{b[n]\vec{b}[n]\}$, the correlation matrix $B[n]=E\{\vec{b}[n]\vec{b}[n]^T\}$, and the means $\vec{mb}[n]=E\{\vec{b}[n]\}$ $\vec{\pi}^{(n)}\Delta[\pi^{(n)}[-N_1-L_2],\ldots,\pi^{(n)}[0],\ldots,\pi^{(n)}[N_2+L_1]]^T$ $\vec{x}^{(n)}\Delta[x^{(n)}[-N_1],\ldots,x^{(n)}[0],\ldots,x^{(n)}[N_2]]^T$ $\vec{bb}^{(n)}\Delta[bb^{(n)}[-N_1-L_2]\ldots,bb^{(n)}[0],\ldots bb^{(n)}[N_2]]_T=[0,\ldots 0,1,0,\ldots,0]^T$ 2. Initialize buffers for priors $\vec{\pi}^{(n)}$ and data $\vec{x}^{(n)}$, in terms of the signal $x[n]$ and the input $\pi_{IN}^E$.

$\vec{x}^{(0)}=[0,0,\ldots,x[0],x[1],\ldots,x[N_2]]^T$ $\vec{\pi}^{(0)}=[0,0,\ldots,0,\pi_{IN}^E[0],\pi_{IN}^E[1],\ldots,\pi_{IN}^E[N_2+L_1]]^T$ 3. Loop over the data for $n=0,\ldots,N$:

$\pi^{(n)}[0]=\frac{1}{2}$ $\vec{mb}^{(n)}=2\vec{\pi}^{(n)}-1$ $\text{diag}(B)=\text{diag}(1,1,\ldots,1)$ $\vec{c}[n]=[H(B-\vec{mb}^{(n)}\vec{mb}^{(n)T})H_T+\sigma_w^2 I]^{-1}H\vec{bb}^{(n)}$ $\hat{b}[n]=\vec{mb}^{(n)}+\vec{c}^{(n)T}(\vec{x}^{(n)}-H\vec{mb}^{(n)})$ $\vec{x}^{(n+1)}=[x^{(n)}[-N_1+1],\ldots,x^{(n)}[N_2],0]$ $\vec{\pi}^{(n+1)}=[\pi^{(n)}[-N_1-L_2+1],\ldots,\pi^{(n)}[N_2+L_1],0]$ if $n<N-N_2$ $x^{(+1)}[N_2]=x[n+1+N_2]$ if $n<N-N_2-L_1$ $\pi^{n+1}[N_2+L_1]=\pi_{IN}^E[n+1+N_2+L_1]$ 4. Estimate output variance $\sigma_{\hat{b}}^2=(\text{var}(\hat{b}|\hat{b}>0)+\text{var}(\hat{b}|\hat{b}<0))/2$ 5. Determine output priors, $$\pi_{OUT}^E=1/2\left(1+\tanh\left(\frac{\hat{b}[n]}{\sigma_{\hat{b}}^2}\right)\right)$$

Soft-Input Soft-Output Decision Feedback Equalization

For a minimum mean-square error (MMSE) decision feedback equalizer, the channel model can be written in similar matrix form to the MMSE linear equalizer, $$\begin{bmatrix}\vec{x}[n]\\\vec{d}[n]\end{bmatrix}=\begin{bmatrix}H\\I_{M\times M}\mid 0_{M\times M}\end{bmatrix}\vec{b}[n]+\begin{bmatrix}\vec{w}[n]\\0_{M\times 1}\end{bmatrix},$$

where, for simplicity of notation, it is assumed that the number of decision symbols feedback to the equalizer is given by $M=N_1+L_2$, for $\vec{d}[n]=[d[n-1],\ldots,d[n-M]]$. For binary antipodal signaling, $d[n-k]=\text{sign}(\hat{b}[n-k])$, and for higher order signaling constellations, a suitable quantizer to the nearest symbol would be used.

The MMSE DFE coefficients are then given by $$\tilde{b}[n]=E\{b[n]\}+\left[E\{b[n]\vec{b}[n]\}H^T-E\{b[n]E\{\vec{b}[n]^T\}H^T\mid 0_{1\times M}\right]$$

$$\begin{bmatrix}HE\{\vec{b}[n]\vec{b}[n]^T\}H^T+\\E\{w[n]^2\}I-HE\{\vec{b}[n]\}E\{\vec{b}[n]^T\}H^THE\{\vec{b}[n]\vec{d}[n]^T\}-\\HE\{\vec{b}[n]\}E\{\vec{d}[n]^T\}\\\hline E\{\vec{d}[n]\vec{b}[n]^T\}H^T+\\E\{\vec{d}[n]\}E\{\vec{b}[n]^T\}H^TE\{\vec{d}[n]\vec{d}[n]^T\}-\\E\{\vec{d}[n]\}E\{\vec{d}[n]\}^T\end{bmatrix}^{-1}$$

$$\begin{bmatrix}\vec{x}[n]-HE\{\vec{b}[n]\}\\\vec{d}[n]-E\{\vec{d}[n]\}\end{bmatrix}$$

When this MMSE DFE is made well-behaved, we set $E\{b[n]\}=0$, which, together with some algebra, reduces this expression considerably, to $$\hat{b}[n]=E\{b[n]\vec{b}[n]^T\}H^T[HE\{\vec{b}[n]\vec{b}[n]^T\}H^T+E\{w[n]^2\}I-HE\{\vec{b}[n]\}E\{\vec{b}[n]^T\}H^T-$$

$$(HE\{\vec{b}[n]\vec{d}[n]^T\}-HE\{\vec{b}[n]\}E\{\vec{d}[n]^T\})E\{\vec{d}[n]\vec{d}[n]^T\}^{-1}(E\{\vec{d}[n]\vec{b}[n]^T\}$$

$$H^T-E\{\vec{d}[n]\}E\{\vec{b}[n]^T\}H^T)]^{-1}$$

$$[(\vec{x}[n]-HE\{\vec{b}[n]\})-(HE\{\vec{b}[n]\vec{d}[n]^T\}-HE\{\vec{b}[n]\}E\{\vec{d}[n]^T\})E\{\vec{d}[n]\vec{d}[n]^T\}^{-1}$$

$$(\vec{d}[n]-E\{\vec{d}[n]\})].$$

The preferred implementation of the present invention is shown in the FIGURE. In the FIGURE, a process for encoding/transmission and reception/decoding begins with a set of digital data, depicted as data bits $a_i$. These data bits are then encoded, using forward error correction coding 10, to produce the encoded sequence of bits, depicted as $\tilde{a}_i$.

The encoded data bits are now interleaved (re-ordered) in time using the data interleaver 12. The purpose of the data interleaver is to re-order the data such that the statistical dependencies between the data bits are spread out in time. This makes adjacent data bits in the re-ordered sequence, $b_i$ in the figure, approximately independent of one another. The re-ordered bits $b_i$ are now ready to be transmitted over the channel 16. The process of mapping the bits $b_i$ into channel symbols and transmitting them over the channel is depicted in the FIGURE as block 16. The ISI channel 16 introduces distortion into the sequence of channel symbols. The channel 16 also is assumed to exhibit additive noise, as depicted in the FIGURE. The output of the channel 16, is then the sequence of corrupted channel symbols, x[n]. The received sequence x[n] is then processed by the receiver block 20 to remove effects of the channel. The receiver block comprises several elements.

First, the received data symbols are equalized using a soft-input/soft-output MMSE equalizer 22. The equalizer 22 attempts to eliminate the intersymbol interference (ISI) from the channel. The output of the equalizer 22 is a set of priors, or confidence levels, in the symbol values, labeled as $\Pi_{OUT}^E$ in the figure. The two inputs to the SISO MMSE equalizer 22 are the channel output symbols x[n] and a set of confidence levels in their values, $\Pi_{IN}^E$. On the first pass through the equalizer, an initialization set of confidence levels are used, which are equally-likely to take on all values. Subsequent passes use confidence levels produced by the SISO decoder 24.

The confidence levels are then re-ordered using the de-interleaver 12a to place them in the same order as the corresponding bits in the encoded sequence $a_i$. The confidence levels can now be used in a soft-input/soft-output decoder 24 to produce estimates of the original uncoded data bits $a_i$, labeled as $\Pi_{OUT}^E$ in the figure. The confidence levels over the sequence $a_i$ are then interleaved 12 again, back to the ordering of the channel symbols and the interleaved data bits $b_i$. The confidence levels are now used as input to the SISO MMSE equalizer 22, together with the data x[n]. Whereas in the first pass through the equalizer 22, the confidence levels were arbitrarily preset to initialized values, now the confidence levels have been determined by the decoding process. This cycle is repeated until either a convergence criteria is met, or a sufficient number of passes over the data have elapsed. Typically, the convergence criteria will consist of a prespecified measure of match between the confidence levels determined by the decoding process and those determined by the equalization process. Other possible convergence criteria could include testing that the confidence levels determined by one or the two SISO devices have not changed appreciably over a sequence of passes.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for estimating digital data received over a potentially noisy channel which adds intersymbol interference or additive noise, or a combination of intersymbol interference or additive noise, the method comprising steps of:
    inputting data received from the noisy channel into a SISO MMSE equalizer;
    inputting a set of priors over symbol values of the noisy channel including a separate prior for each received noisy channel symbol value, into the SISO MMSE equalizer;
    equalizing, by an MMSE equalization in the SISO MMSE equalizer, the data received from the noisy channel and the set of priors over symbol values to produce a symbol value estimate;
    mapping output of the SISO MMSE equalizer onto priors over the symbol values to produce a confidence indication in each of the symbol value estimates as a function of time;
    wherein said step of equalizing excludes symbol value estimates which are functions of an input distribution of a current symbol being equalized;
    wherein digital data transmitted over said potentially noisy channel is error correction encoded prior to transmission, the step of mapping output of the SISO MMSE equalizer comprising steps of:
    passing output of the SISO MMSE equalizer into a SISO error correction decoder;
    using an output of said SISO error correction decoder as the set of priors over symbol values;
    repeating all steps of the method until a predetermined convergence criterion is reached between said SISO error correction decoder and said SISO MMSE equalizer;
    wherein digital data transmitted over said potentially noisy channel is interleaved prior to transmission and a step of de-interleaving is conducted on the output of the SISO MMSE equalizer prior to said step of passing output of the SISO MMSE equalizer into the SISO error correction decoder.

2. The method according to claim 1, wherein said SISO error correction decoder has its output restricted to exclude symbol value estimates which are functions of an input distribution of a current symbol being decoded.

3. A data decoding device comprising:
    a SISO MMSE equalizer;
    a SISO decoder, the decoder exchanging symbol estimates with the SISO MMSE equalizer, the SISO MMSE equalizer produces an MMSE linear estimate, and corresponding output distribution of estimates b̂[n] of transmitted symbols [b̂[n]] b[n], and mapping the output distribution to an output set of priors over the symbols $\pi_{OUT}^E$;
    wherein said equalizer maps the estimates by treating the output distribution of estimates b̂[n] as conditionally Gaussian, and distributed about the symbol values.

4. The device according to claim 3, wherein the output distribution mapping is defined as:

$$Prob\{b[n]=1 \mid \hat{b}[n]\} = \frac{1}{2}\left(1+\tanh\left(\frac{\hat{b}[n]}{\sigma_{\hat{b}}^2}\right)\right),$$

where $\sigma_{\hat{b}}^2$ is the variance of the conditional output distribution given the symbol $b[n]=\text{sign}(\hat{b}[n])$, and the calculation of estimates $\hat{b}[n]$ excludes the corresponding $\pi_{IN}^E[n]$ wherein $\Pi_{IN}^E[n]$ is the output set of priors over the symbols $\pi_{OUT}^E$, and the expectations are taken over a distribution of the symbols which excludes $\pi_{IN}^E[n]$ for the calculation of the estimates $\hat{b}[n]$.

5. The device according to claim 3, wherein the following steps are conducted by the device for computing the output distribution given the observations, x[n] and the input distribution $\pi_{IN}^E$ used by the MMSE equalizer:

a. create buffers for the priors, the signal x[n], expectations $\vec{bb}[n]=E\{b[n]\vec{b}[n]\}$, the correlation matrix $B[n]=E\{\vec{b}[n]\vec{b}[n]^T\}$, and the means $\vec{mb}[n]=E\{\vec{b}[n]\}$ $\vec{\pi}^{(a)} \Delta [\pi^{(n)}[-N_1-L_2], \ldots, \pi^{(n)}[0], \ldots, \pi^{(n)}[N_2+L_1]]^T$ $\vec{x}^{(a)} \Delta [x^{(n)}[-N_1], \ldots, x^{(n)}[0], \ldots, x^{(n)}[N_2]]^T$ $\vec{bb}^{(n)} \Delta bb^{(n)}[-N_1-L_2], \ldots, bb^{(n)}[0], \ldots bb^{(n)}[N_2]]^T = [0, \ldots 0, 1, 0, \ldots, 0]^T$ b. initialize buffers for priors $\vec{\pi}^{(n)}$ and data $\vec{x}^{(n)}$, in terms of the signal x[n] and the input $\pi_{IN}^E$ $\vec{x}^{(0)}=[0, \ldots, x[0], x[1], \ldots, x[N_2]]^T$ c. loop over the data for n=0, ..., N:

$\pi^{(n)}[0]=\frac{1}{2}$ $\vec{mb}^{(n)}=2\vec{\pi}^{(n)}-1$ $B=\vec{mb}^{(n)}\vec{mb}^{(n)T}$ $\text{diag}(B)=\text{diag}(1, 1, \ldots, 1)$ $\vec{c}[n]=[H(B-\vec{mb}^{(n)}\vec{mb}^{(n)T})H^T+\sigma_w^2 I]^{-1}H\vec{bb}^{(n)}$ $\hat{b}[n]=\vec{mb}^{(n)}+\vec{c}^{(n)T}(\vec{x}^{(n)}-H\vec{bb}^{(n)})$ $\vec{x}^{(n+1)}=[x^{(n)}[-N_1+1], \ldots, x^{(n)}[N_2], 0]$ $\vec{\pi}^{(n+1)}=[\pi^{(n)}[-N_1-L_2+1], \ldots, \pi^{(n)}[N_2+L_1], 0]$ if $n<N-N_2$
  $x^{(n+1)}[N_2]=x[n+1+N_2]$
if $n<N-N_2-L_1$
  $\pi^{(n+1)}[N_2+L_1]=\pi_{IN}^E[n+1+N_2+L_1]$ d. estimate output variance $\sigma_{\hat{b}}^2=(\text{var}(\hat{b}|\hat{b}>0)+\text{var}(\hat{b}|\hat{b}<0))/2$ e. determine output priors, $$\pi_{OUT}^E = 1/2\left(1+\tanh\left(\frac{\hat{b}[n]}{\sigma_{\hat{b}}^2}\right)\right).$$

* * * * *

UNITED STATES PATENT AND TRADEMARK OFFICE
CERTIFICATE OF CORRECTION

PATENT NO.       : 7,016,440 B1                                            Page 1 of 1
APPLICATION NO.  : 09/640204
DATED            : March 21, 2006
INVENTOR(S)      : Singer et al.

It is certified that error appears in the above-identified patent and that said Letters Patent is hereby corrected as shown below:

Col. 5, line 4, before " $\pi_{in}^{D}$ ", please delete "in".

Col. 6, line 65, before " $\pi_{in}^{E}$ ", please delete "TE".

Col. 8, line 1, please delete "$X^{(+1)}$", and insert --$X^{(n+1)}$-- therefor.

Col. 8, line 3, please delete "$\pi^{n+1)}$", and insert --$\pi^{(n+1)}$-- therefor.

Col. 11, line 24, please delete " $\vec{\pi}^{(a)}$ " and insert -- $\vec{\pi}^{(n)}$ -- therefor.

Col. 11, line 25, please delete " $\vec{x}^{(a)}$ " and insert -- $\vec{x}^{(n)}$ -- therefor.

Col. 11, line 26, please insert a bracket --[-- between "$\underline{\Delta}$" and "$bb^{(n)}$".

Col. 12, line 1, after " $x[N_2]]^T$ ", please insert -- $\vec{\pi}^{(0)} = [0,0,\ldots,0,\pi_{IN}^{E}[0],\pi_{IN}^{E}[1],\ldots,\pi_{IN}^{E}[N_2+L_1]]^T$ --.

Col. 12, line 11, please delete " $\vec{H}bb^{(n)}$ " and insert -- $\vec{H}mb^{(n)}$ ) -- therefor.

Signed and Sealed this

Twenty-fourth Day of October, 2006

JON W. DUDAS
*Director of the United States Patent and Trademark Office*